Figure 26:
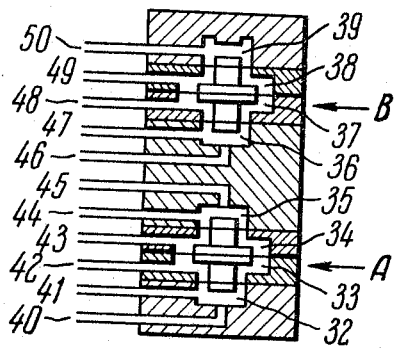

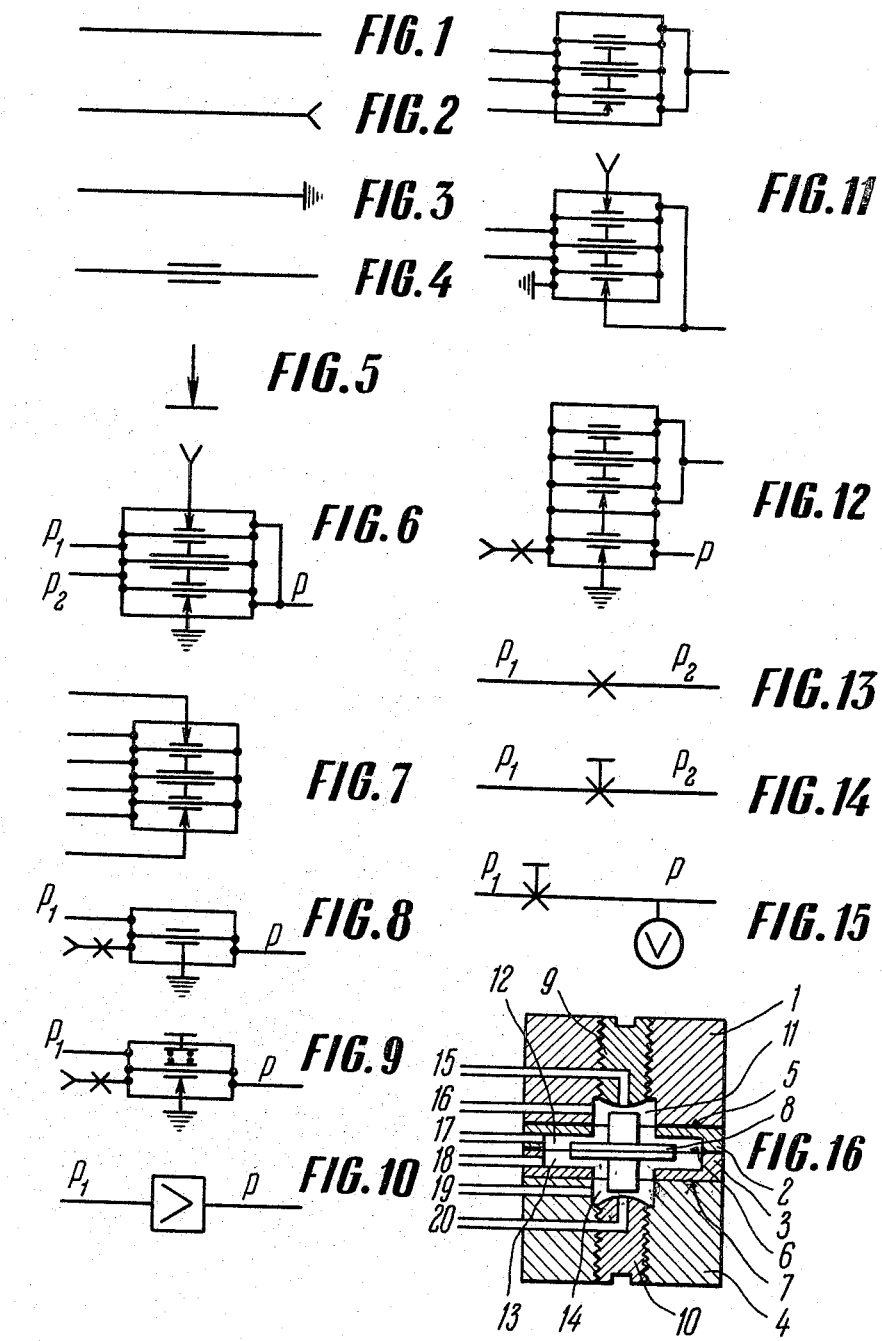

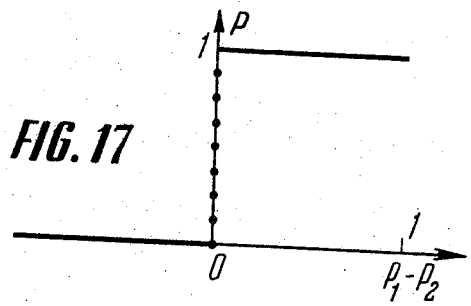
FIG. 17
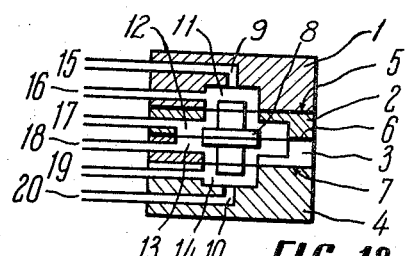
FIG. 18
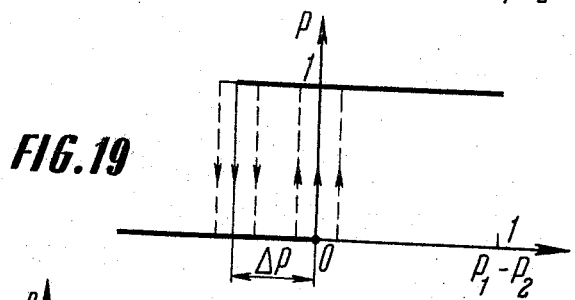
FIG. 19
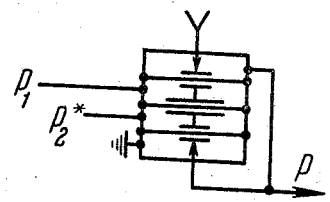
FIG. 20
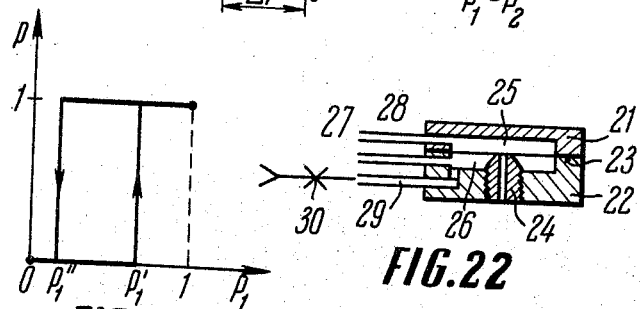
FIG. 21
FIG. 22
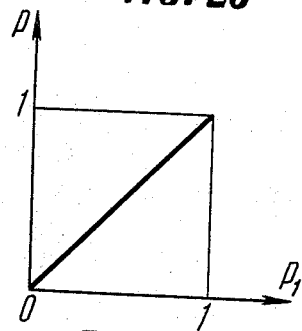
FIG. 23
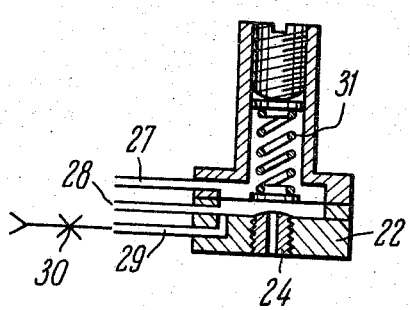
FIG. 24
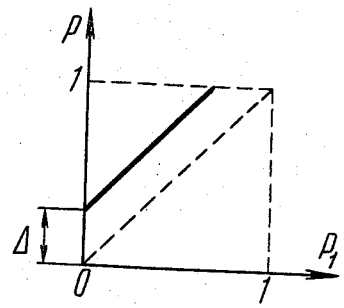
FIG. 25

Aug. 15, 1967  A. A. TAL ET AL  3,335,950
STANDARDIZED MODULAR SYSTEMS
Filed June 10, 1964  7 Sheets-Sheet 4

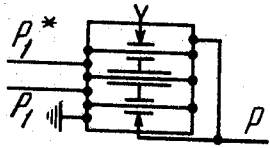
FIG.37
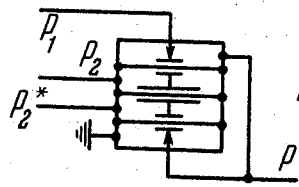
FIG.38
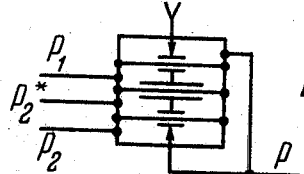
FIG.39
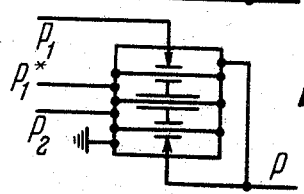
FIG.40
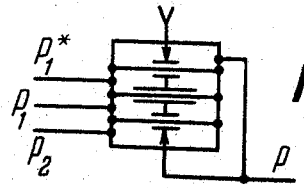
FIG.41
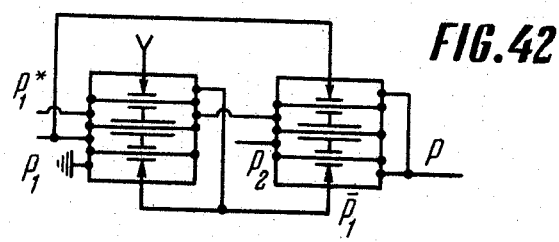
FIG.42
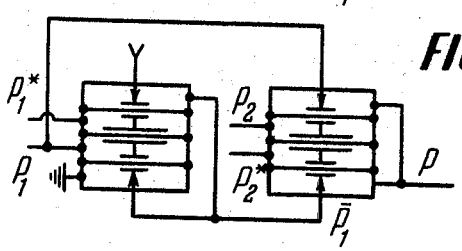
FIG.43
| | $p_1$ | 0 | 1 | 0 | 1 |
|---|---|---|---|---|---|
| | $p_2$ | 0 | 0 | 1 | 1 |
| a | $p = \bar{p}_1$ | 1 | 0 | 1 | 0 |
| b | $p = p_1 \wedge p_2$ | 0 | 0 | 0 | 1 |
| c | $p = p_1 \vee p_2$ | 0 | 1 | 1 | 1 |
| d | $p = p_1 \rightarrow p_2$ | 0 | 1 | 0 | 0 |
| e | $p = p_2 \rightarrow p_1$ | 1 | 1 | 0 | 1 |
| f | $p = p_1 \triangledown p_2$ | 0 | 1 | 1 | 0 |
| g | $p = p_1 \sim p_2$ | 1 | 0 | 0 | 1 |
FIG.36

United States Patent Office 3,335,950
Patented Aug. 15, 1967

3,335,950
STANDARDIZED MODULAR SYSTEMS
Alexey Alexeevich Tal, Malaya Molchanovka 8, app. 23;
Agnia Arcadjevna Tagaevskaya, Piatnitskaya ul 53,
app. 7; and Tatiana Konstantinovna Berends, Maly
Kakovinsky per. 6, app. 9, all of Moscow, U.S.S.R.
Filed June 10, 1964, Ser. No. 373,996
3 Claims. (Cl. 235—201)

This application is a continuation-in-part of a prior application filed Oct. 18, 1961, Serial No. 147,128, now abandoned.

The present invention relates to improvements in and relating to standardized modular systems.

This invention relates generally to automation, and more particularly to one of its specific fields, viz. to a system of pneumatic elements of industrial automation intended to design checking, controlling, adjusting and computing circuits.

It is well known that at the present time the principal means of complex automation of industrial processes are the pneumatic units of systems designed according to the aggregate principle based on making automatic circuits from separate units chosen according to the functional attribute, i.e. when each system unit is intended for performing certain functions coming to realization of a definite complex of operations.

The following examples belong to such well-known aggregate systems of pneumatic units: The "AYC" pneumatic aggregate unified system of the "Tizpribor" factory; a system of gauges named "Tsvetmetavtomatika" and a system of the "Glavchermet" central laboratory (all of the U.S.S.R.), and as well as aggregate systems of pneumatic units of the Moore, Brown, Sunweek, DRD, Taylor and other firms.

"Tizpribor" and "KB Tsvetmetavtomatika" are abbreviated names of Soviet enterprises which designed and now produce control equipment of the Aggregate Unified System (AYC). Information on this equipment can be found, for instance, in M. D. Lemberg's "Pnevmoavtomatica," a booklet published by Gosenergoizdat, Moscow Leningrad, 1961 (from the "Automation Library" series) or in the book by Beriozovets et al. "Pneumatic Aggregate Unified System Devices and Their Employment in Automation of Industrial Processes," publishers Gostoptechizdat, 1960, Moscow. The British firm, Sunvic, manufactures pneumatic controlling equipment similar to the AYC equipment.

Each of the above systems comprises a set of pneumatic units which may vary from system to system and has to be enlarged to meet the requirements of designing various circuits for automatic checking, control, adjustment and computing.

Out of all known aggregate systems the most complete is the above-mentioned AYC comprising 24 units; followed by those of Sunweek and DRD containing 12 units each. Input and output parameters inside each of these systems are unified which enables these units to be connected in various members and combinations to form automation circuits within the limits of constructional abilities of each unit. As to an example of unified input and output parameters generally adopted for units we may refer here to compressed air pressure varying within the limits of 0.2 to 1.0 atm. gauge and feeding pressure of 1.4 atm. gauge.

The units of the above aggregate automatic systems consists of a relay of the "nozzle-shutter" type membranes separated by spacers, throttles and leads for connecting the unit to the air main. Design of each unit has its own specific features and differs from each other; all of them being of limited abilities. Hence, in spite of considerable numbers of units constituting these systems, their abilities are also limited. These limitations have become especially pronounced recently when the objects to be controlled require the use of new original circuits for checking, control, adjustment or computing based on complicated laws. For example, without introducing new special units into these systems, it is simply impossible to carry out by means of their old set of units remote control of ratio value of two parameters; ratio control of two parameters with automatic correction by the third parameter; optimum control; algebraic and logical operations. These operations have become an urgent need today in view of the widely spread devices accomplishing operations of discrete technique by pneumatic means, where the number of various circuits is so large that by utilizing the known principles of design of pneumatic units it is simply impossible to make any multipurpose systems ensuring the possibility design of all these circuits.

In connection with the above mentioned shortcomings of the existing aggregate pneumatic systems there arises a problem of designing such a new industrial automatic system of pneumatic elements which would enable one to make the most varied checking, controlling, adjusting and computing devices, the pneumatic units of the well-known aggregate systems included out of the minimum number of these elements, the latter being so constructed as to ensure flexible and effective grouping of these elements into automatic circuits.

The present invention gives a solution to this problem which consists in the following:

A system is comprised not of units realizing certain laws and accomplishing a certain complex of operations, but of elements, each of which is capable of carrying out one simple logical operation only. The design of these elements is similar to that of the aggregate system units and comprise, mainly, membranes, "nozzle-shutter" type relays and a throttle; the quantity of these components being confined to a number required for an element to fulfill a single simple logical operation.

It is obvious now that such construction of the elements makes it possible to design a multipurpose system comprising a comparison element, pneumatic relay, discrete and continuous pneumatic repeaters, discrete and continuous memory elements and pneumatic inertia components, adjustable and non-adjustable pneumatic resistances and panels for mounting required circuits composed of the system elements.

The principal object of this invention is to provide a multipurpose system of industrial automatic elements enabling the minimum number of these elements to be designed in any modern systems of automatic check, control, adjustment and computing.

Another object of this invention is to provide a system of industrial pneumatic elements enabling the elements to be assembled into circuits in quite a rapid and simple manner.

Still another object of the present invention is to provide a system of elements of industrial pneumatic automation which makes it possible to carry out any logical functions and remembering operations.

It is understood that in the course of realization of the invention explained herein some changes may be made within the limits of the claims without deviating from the idea of the invention.

Figure 27:
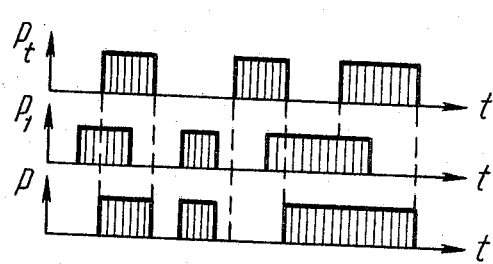
Figure 28:
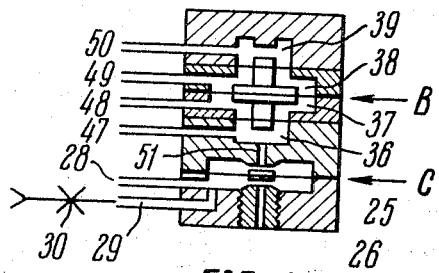
Figure 29:
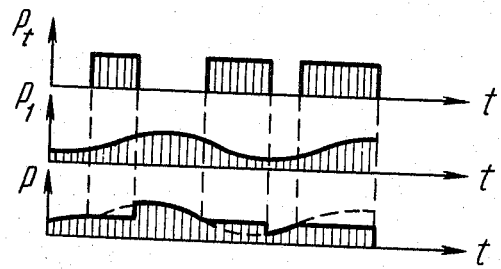
Figure 30:
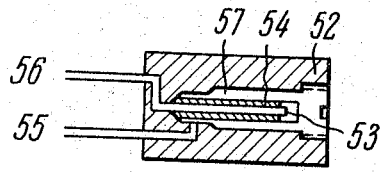
Figure 31:
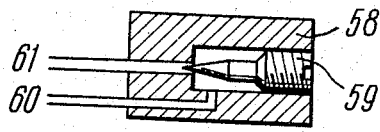
Figure 32:
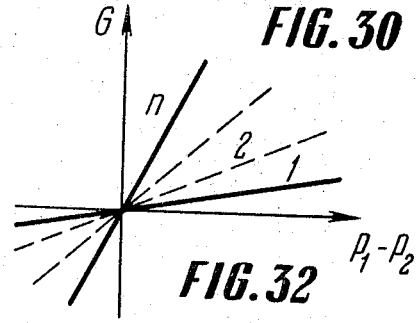
Figure 33:
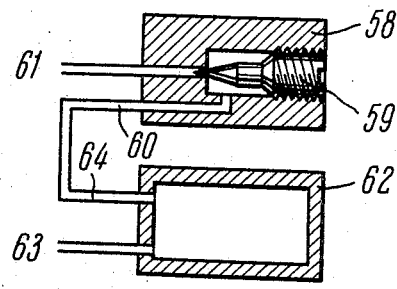
Figure 34:
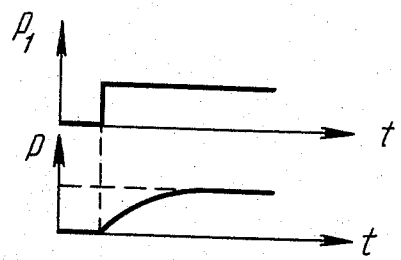
Figure 35:
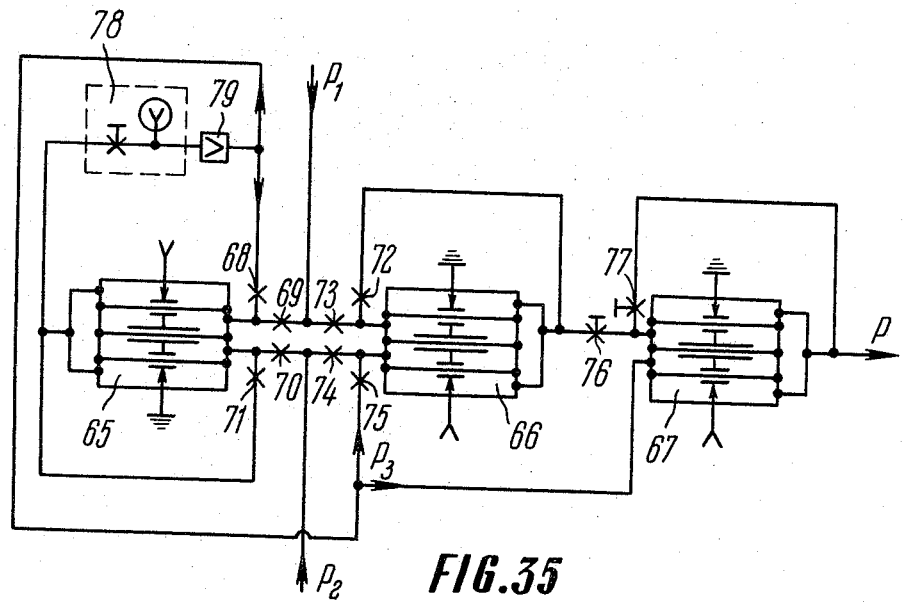

Other purposes and advantages of the present invention will become obvious from the following description illustrated when taken in conjunction with the accompanying drawings wherein:

FIGURES 1 to 15 present conventional signs used in FIGURES 16 to 46;

FIGURE 1 is a schematic symbol of a pneumatic line;
FIGURE 2 is a schematic symbol of a feeding end of a pneumatic line;
FIGURE 3 is a schematic symbol of a pneumatic line end connected with atmosphere (hereinafter referred to as "grounded");
FIGURE 4 is a schematic symbol of a membrane with a rigid centre;
FIGURE 5 is a schematic symbol of a nozzle-shutter;
FIGURE 6 is a schematic diagram of a comparison element;
FIGURE 7 is a schematic diagram of a pneumtaic relay;
FIGURE 8 is a schematic diagram of a continuous pneumatic repeater;
FIGURE 9 is a schematic diagram of a continuous pneumatic repeater with a shift;
FIGURE 10 is a schematic diagram of a continuous pneumatic repeater with a powerful output;
FIGURE 11 is a schematic diagram of a discrete memory element;
FIGURE 12 is a schematic diagram of a continuous memory element;
FIGURE 13 is a schematic diagram of a continuous non-variable pneumatic resistance (throttle);
FIGURE 14 is a schematic diagram of a continuous variable pneumatic resistance (throttle);
FIGURE 15 is a schematic diagram of a pneumatic inertia component;
FIGURE 16 is a semiconstructional diagram of the comparison element;
FIGURE 17 is a curve of the functional characteristic of the comparison element;
FIGURE 18 is a semiconstructional diagram of the pneumatic relay;
FIGURE 19 is a curve of the functional characteristic of the pneumatic relay;
FIGURE 20 is a schematic diagram of a discrete pneumatic repeater;
FIGURE 21 is a curve of the functional characteristic of the discrete pneumatic repeater;
FIGURE 22 is a semiconstructional diagram of a continuous pneumatic repeater;
FIGURE 23 is a curve of the functional characteristic of the continuous pneumatic repeater;
FIGURE 24 is a semiconstructional diagram of the continuous pneumatic repeater with a shift;
FIGURE 25 is a curve of the functional characteristic of the continuous pneumatic repeater with a shift;
FIGURE 26 is a semiconstructional diagram of the discrete memory element;
FIGURE 27 is a curve of the time characteristics for the discrete memory element;
FIGURE 28 is a semiconstructional diagram of the continuous memory element;
FIGURE 29 is a curve of the time characteristics for the continuous memory element;
FIGURE 30 is a semiconstructional diagram of the non-variable permanent pneumatic resistance;
FIGURE 31 is a semiconstructional diagram of the variable permanent pneumatic resistance;
FIGURE 32 is a curve of the characteristics of the variable permanent pneumatic resistance;
FIGURE 33 is a semiconstructional diagram of the pneumatic inertia component;
FIGURE 34 is a curve of the time characteristic for the pneumatic inertia component;
FIGURE 35 is an isodrom controller incorporating multipurpose system elements;
FIGURE 36 is a table of algebraic logical functions (operations) realized on the pneumatic relay by the following:

a—"Not" function;
b—"And" function (conjunction);
c—"Or" function (disjunction);
d—"Prohibition" or "no go";
e—"If-then" amplification;
f—"Excluded or"; and
g—"Tantamount to" function.

Figure 44:
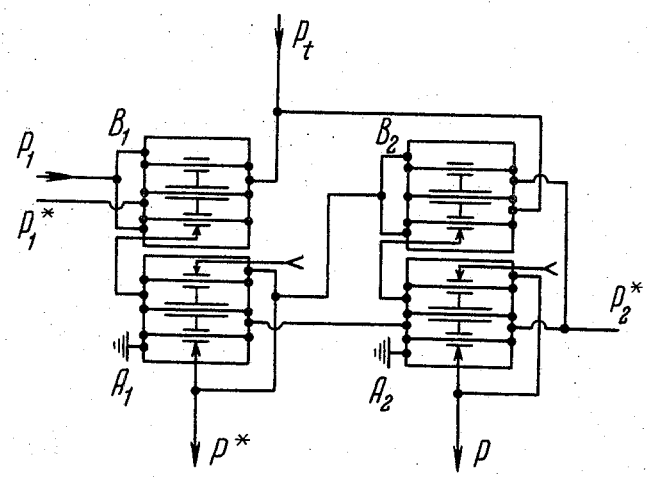
Figure 45:
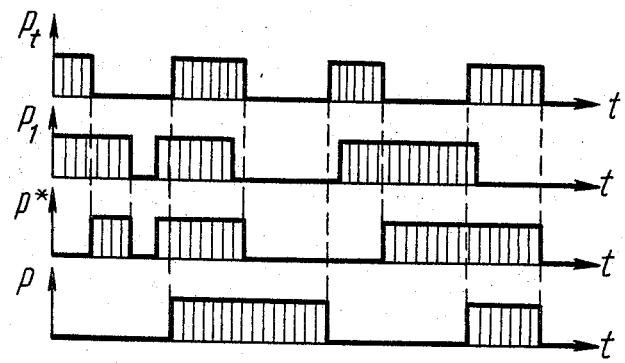
Figure 46:
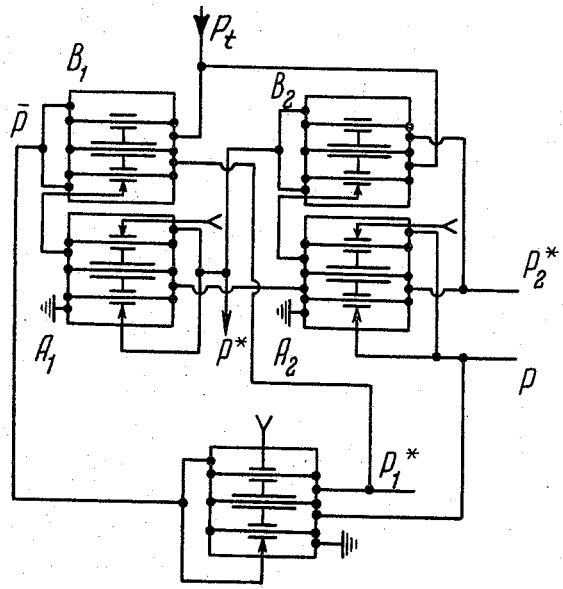
Figure 47:
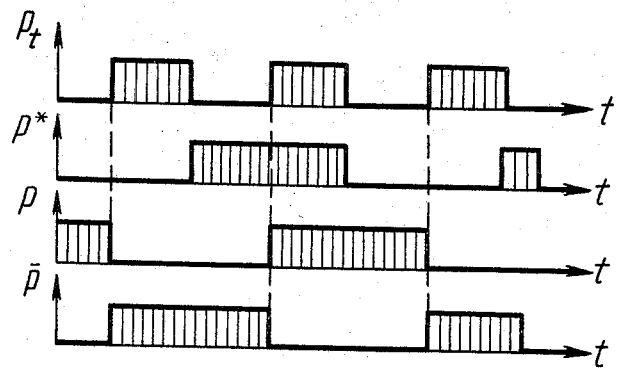

FIGURE 37 is a schematic diagram of a pneumatic relay performing a not function;
FIGURE 38 is a schematic diagram of a pneumatic relay performing an and function;
FIGURE 39 is a schematic diagram of a pneumatic relay performing an or function;
FIGURE 40 is a schematic diagram of a pneumatic relay performing a prohibition or no go function;
FIGURE 41 is a schematic diagram of a pneumatic relay performing an if-then amplification function;
FIGURE 42 is a schematic diagram of a pneumatic relay performing an excluded or function;
FIGURE 43 is a schematic diagram of a pneumatic relay performing a tantamount to function;
FIGURE 44 is a schematic diagram of a pneumatic "one-pulse delay" cell;
FIGURE 45 is a curve of the time characteristics for the pneumatic one-pulse delay cell;
FIGURE 46 is a schematic diagram of a pneumatic flip-flop; and
FIGURE 47 is a curve of the time characteristics for the pneumatic flip-flop.

The following symbols are made use of in FIGURES 1 to 47 and throughout the text:

$P_1$—The first independent input signal received by the element as pressure, in atm. gauge;
$P_2$—The second independent input signal received by the element as pressure, in atm. gauge;
$P_3$—The third signal received by the element as pressure, in atm. gauge;
$P^*_1$—Certain constant pressure (in atm. gauge) locked in the blind chamber of the element (the so-called "back pressure");
$P^*_2$—Certain constant pressure (in atm. gauge) locked in the blind chamber of the element (back pressure), $P_2$ being more than $P_1$;
$P_t$—Control input signal (timing code), received by the element as pressure, in atm. gauge;
P—Signal shaped at the output of the element as pressure (in atm. gauge) being, in general view, a function of independent input signals $P_1$ and $P_2$;
$P_1'$—"Operation" pressure of the first input pressure, in atm. gauge;
$P_1''$—"Releasing" pressure of the first input pressure, in atm. gauge;
$\Delta P$—Width of hysteresis loop in atm. gauge of the pneumatic relay characteristic;
G—Weight rate of air, in kg./sec.;
V—Volume, in cu. cm.;
R—Gas constant, in cm./° K.;
$\Theta$—Absolute temperature, in ° K.;
T—Time constant of the controller;
k—Proportional factor of the controller; and
t—Time, in sec.

Symbol "0" corresponds conventionally to a pressure of 0 atm. gauge and "1" corresponds to the supply pressure.

The automatic multipurpose system of industrial pneumatic elements consists of seven types of elements each accomplishing one simple operation. Nomenclature of the multipurpose system elements is comprised to meet the necessity of accomplishing linear computing operations, simulating of linear and nonlinear dynamic systems, realising algebraic and time logical functions, designing systems of pulse and intermittent control as well as those with "memory."

For carrying out linear computing operations and simulating linear and nonlinear dynamic systems the system is provided with an element which serves as an operational (computing) amplifier. The system comprises a comparison element which can be used as the operational amplifier. The pneumatic relay being the second principal element of the system, enables all algebraic logical functions to be realised. The presence of the discrete continuous memory element makes it possible to realize time logical functions to design systems of pulse and intermittent control as well as to design systems with memory.

Besides the four principal elements the system should be provided with elements of minor importance. To these the discrete and continuous repeaters, nonvariable and variable permanent pneumatic resistances and pneumatic inertia component belong.

Thus, the proposed system comprises the following set of pneumatic elements:
(1) Comparison element.
(2) Pneumatic relay.
(3) Discrete and continuous pneumatic repeaters.
(4) Discrete memory element.
(5) Continuous memory element.
(6) Nonadjustable and adjustable permanent pneumatic resistances.
(7) Pneumatic inertia component.

As a comparison element a pneumatic device is utilised as intended to compare two independent pneumatic signals denoted $P_1$ and $P_2$ (FIGURE 6) which are supplied to the input of the comparison element as pressures varying within the limit from 0 atm. gauge to the supply pressure adopted in the system (say, 1.4 atm. gauge). At the output of the comparison element pressure P is set which will vary from 0 atm. gauge to the supply pressure depending on the magnitude of difference (unbalance) of input values of $P_1$ and $P_2$. If $P_1-P_2>0$, then the output pressure P is equal to the supply pressure. If the difference of input pressures $P_1-P_2<0$, then the output pressure P is equal to 0 atm. gauge. At $P_1-P_2=0$ the output pressure P is indefinite and its value may lie anywhere within the pressure range between 0 atm. gauge and the supply pressure.

The comparison element, the semiconstructional diagram of which is shown in FIGURE 16, is assembled from individual discs 1, 2, 3, and 4, separated by flexible membranes 5, 6, and 7 which are rigidly connected axially by means of a common rigid center 8. The ends of center 8 serve as valve members, plugs, closures or shutters for movable nozzles 9 and 10. Chambers 11, 12, 13, 14 and nozzle channels are provided with leads 15, 16, 17, 18, 19, and 20 arranged at one side of the elements. Nozzle-shutter is a common term for a pneumatic contact, comprising a nozzle or opening to admit air, and a shuttle or device to close said opening. Air flow is controlled by approaching or withdrawing the shuttle to or from the nozzle. The membranes are coupled by a common rod or rigid center, whose ends serve as movable shuttles for stationary nozzles. The membranes divide the element body into the required number of blind chambers.

The comparison element is symmetrical relative to membrane 6. Supply is fed through lead 15 to a feeding port 9 (nozzle 9), the other nozzle 10 includes an end port connected with atmosphere via lead 20. The input pressures $P_1$ and $P_2$ are supplied through input ports to blind chambers 12 and 13 separated by membrane 6 through leads 17 and 18 respectively. By connecting leads 16 and 19 and the output ports, chambers 11 and 14 are united in a common chamber where the output pressure P of the comparison element is formed.

The three-membrane assembly of the comparison element receives the effect of pressures, and, as a result, a certain gross thrust is exerted on the rigid center along its axis which displaces it in the direction of the thrust action. The center shuts off one of the nozzles and opens the other. Thus, in the comparison element the relay characteristic given in FIGURE 17 is realized. If $P_1-P_2>0$, then $P=1$; at $P_1-P_2<0$, $P=0$; and at $P_1-P_2=0$, P is indefinite.

The comparison element is adjusted with the aid of movable nozzles 9 and 10. High accuracy of this element (error throughout the whole scale does not exceed 0.5%) is ensured by the presence of two coupled pairs nozzle-shutter and high sensitivity of the membrances.

The pneumatic device presented in FIGURE 18 serves as a pneumatic relay. Its design is to a great extent similar to that of the comparison element. It is made up of discs 1, 2, 3, and 4 separated by membranes 5, 6 and 7 and rigidly connected by a common center 8, the ends of which serve as valve members, plugs, or shutters of nozzles 9 and 10. Both nozzle-shutter pairs carry out in this element the functions of pneumatic contacts of opposite action: when one contact is closed the other is open and vice versa. Chambers 11, 12, 13, 14 and nozzles 9 and 10 are equipped with leads 15, 16, 17, 18, 19, and 20 arranged at one side of the pneumatic relay which are similar to those of the comparison element. The pneumatic relay is also symmetrical relative to membrane 6. This three-membrane assembly like that of the comparison element reacts on the input pressures $P_1$ and $P_2$ which in this case have only discrete values 0 and 1. The output pressure P of the pneumatic relay is formed depending on the condition of both contacts and may be equal to 0 or 1.

In the pneumatic relay the relay characteristics shown in FIGURE 19, in contrast to that of the comparison element (FIGURE 17), has a hysteresis loop $\Delta P$ of considerable size. That is, when the difference of input pressures reverses, the output pressure lags behind and does not change at the same point therewith. This difference is known as the hysteresis and is illustrated in the curve by the hysteresis loop shown. The relay characteristic is plotted for the case when the pneumatic relay is connected in the following way: supply is fed to lead 15, lead 19 is connected with the ambient air and leads 16 and 20 are coupled into a common chamber from which the output pressure P is obtained. The input signal $P_1$ is fed to chamber 12 through lead 17 and $P_2$ is fed to chamber 13 via lead 18.

The pneumatic relay meant for discrete technique is designed much simpler than the comparison element. The presence of two connected pneumatic contacts in the pneumatic relay ensures the absence of continuous air consumption through the element which leads to low consumptions in circuits comprising these elements.

Complete isolation of chambers 11, 12, 13, 14, and the channels of nozzles 9 and 10 as also lead connection of the element enable the pneumatic relay to be made use of in various circuit connections. The pneumatic relay has maximum operating sharpness when it is cut in to use the effect of positive feedback.

The function of the repeaters (both discrete and continuous) is that of forming the output signal P at the expense of an independent source of supply equal to the input pressure $P_1$ (of the same or heightened power), or differing from it by constant $\Delta$. Discrete pneumatic repeaters, as a rule, are used in developed discrete circuits for keeping the signal at high level (equal to 1), they repeat the input signal $P_1$ at the expense of an additional source of supply within the limits of the same power.

Used successfully as a discrete pneumatic repeater is a pneumatic relay cut in according to the diagram shown in FIGURE 20. The repeater is an element with equal output and input. For instance, the pneumatic relay can be provided with a discrete repeater or "yes" element. Here the output pressure P is a simple function of the input pressure $P_1$. The second input pressure $P_2$ does not vary its value, it is kept constant and equal to $P_2^*$. Then, coming back to FIGURE 18 it is obvious that the function of discrete repeating is accomplished by the pneumatic relay provided the supply is fed through lead 15, the input pressure is fed to chamber 12 through lead 17, the pressure $P_2^*$ is kept constant in chamber 13 through lead 18, chamber 14 is associated with the ambient air through lead 19, and chamber 11 and the chamber of nozzle 10 are interconnected via leads 16 and 20. Then the output pressure P will be discretely equated with the input pressure $P_1$, and the pneumatic relay cut in according to such circuit will realize the characteristic given in the curve of FIGURE 21 viz.; when the input pressure $P_1$ exceeds the value of the "operating" pressure $P_1$ which is determined by the pressure $P_2^*$ "locked" in the blind chamber 13, pressure P at the output of the pneumatic relay is equal to 1, and when the input pressure $P_1$ falls short of $P_1$ which is determined by the value of the hysteresis loop $\Delta P$ (of the "releasing" pressure), then $P=0$.

Utilized as a continuous pneumatic repeater is the pneumatic presented in FIGURE 22 consisting of discs 21, 22, separating membrane 23 and nozzle 24. Chambers 25 and 26 are supplied with leads 27, 28, and 29. The input pressure $P_1$ is supplied to the blind chamber through lead 27. Supply is fed to flow chamber 26 through lead 29 with constant resistance 30 (a pneumatic throttle) being necessarily connected before lead 29. Then, the output pressure P reduced from the element through lead 28 out of the flow (interthrottle) chamber 26 is constantly equated with the input pressure $P_1$ at the expense of the amount of air bypass through nozzle 24 from interthrottle chamber 26 located between constant resistance 30 and the nozzle 24– membrane 23 pair serving as variable resistance. Membrane 23 performs as a shutter with respect to nozzle 24. The characteristic plotted in FIGURE 23 reflects the operation of exact repeating (displacing) of continuous input variable $P_1$ carried out with the help of the continuous repeater.

By introducing spring 31, as is shown in FIGURE 24, it is possible to displace the output pressure P (received from lead 28) relative to the input pressure $P_1$ (fed to lead 27) by a constant $\Delta$ which is determined by tension of spring 31. In this case the characteristic of such continuous repeater (according to FIGURE 25) may displace parallel to the main characteristic (when $\Delta=0$) by a magnitude $\Delta$ shown in the curve of FIGURE 25.

By introducing the second amplifying cascade (another independent supply, for instance, with the help of a pneumatic relay) continuous repeating of the input pressure $P_1$ is carried out with power-amplitude P.

Designed as a discrete memory element is a pneumatic device. Being provided with two independent inputs which may be equal to 0 or 1 (one of these values we shall, as before, denote $P_1$, the other being called the command input $P_t$—and not $P_2$) this device has output P which at one value of the command input $P_t$ (for example, when $P_t=0$) discretely repeats the value of input $P_1$ and at the second value of $P_t$ (that is at $P_t=1$) retains it constant (independent of values of $P_1$) and equal to the value of the input pressure $P_1$ at the moment corresponding to the change of value of $P_t$ (that is from 0 to 1). In other words, the discrete memory element carries out the operation of "memorizing" the input quantity $P_1$ for the period of one state of the command input $P_t$ (for example, $P_t=1$) and "dememorizing" or discrete repeating of the input quantity $P_1$ for the period of the other state of $P_t$ (say, $P_t=0$).

To perform such an operation two pneumatic relays are combined, and, as is seen from FIGURE 26, their purposes being as follows: one of them A serves as a discrete repeater, $P=P_1$, the oher B disconnects the repeater A from the input signal $P_1$, simultaneously locking in to the blind chamber of the pneumatic relay A the pressure $P_1$ equal to the value which occurred at the memorizing moment. The discrete memory element may be cut in circuits in two ways: in one case, memorizing is carried out at $P_t=1$; in the other case at $P_t=0$. The connection diagrams for these two cases differ from each other only by the placement of the input of the command pressure $P_t$. In the first case, when memorizing is performed at $P_t=1$, it is fed through lead 49 to blind chamber 38 of pneumatic relay B; then the constant pressure (the back pressure) is supplied to chamber 37 through lead 48. In the second case, when memorizing is carried out at $P_t=0$, the command pressure $P_t$ is fed through lead 48 into blind chamber 37, then the back pressure is correspondingly supplied to blind chamber 38 through lead 49. The rest of the connections are similar for both cases of cutting in the discrete memory cell. In both cases only one pneumatic contact is used in the pneumatic relay B, viz. the one passing by the input pressure to repeater A. The input pressure $P_1$ is fed to chambers 36 and 39 through leads 47 and 50. On passing the bypass contact of pneumatic relay B, the input pressure through united leads 46 and 43 enters blind chamber 34 of pneumatic relay A which is the discrete repeater and, therefore, is cut in according to the above diagram. FIGURE 27 presents a curve of time characteristics reflecting the operation of the discrete memory element for the case when memorizing is performed as long as $P_t=1$.

Used as a continuous memory element is a pneumatic device which, along with two independent inputs $P_1$ and $P_t$, has output P, the difference consisting in that the input signal $P_1$ varies all the time within the whole pressure range from 0 to 1 whereas the command input $P_t$ may acquire discretely only two values: 0 or 1. The output signal P of the continuous memory element may also be equal to any value lying within the whole range from 0 to 1. Thus, the continuous memory element carries out the operation of memorizing the input pressure $P_1$ during one state of the command input $P_t$ and that of dememorizing or repeating the continuously varying quantity of the input pressure $P_1$ during the other state of $P_t$.

To realize this operation it is enough (as is seen from FIGURE 28) to connect a continuous repeater C with pneumatic relay B. The continuous repeater C is cut in according to the diagram of FIGURE 22. The input pressure $P_1$ enters blind chamber 25 from channel 51 after the pneumatic contact of pneumatic relay B which is cut in the circuit also in two ways: with memorizing at $P_t=1$ or $P_t=0$ with the same connections as in the case of the discrete memory cell.

FIGURE 29 shows a curve of the time characteristics which reflect the operation of the continuous memory element for the case when memorizing is accomplished as long as $P_t=1$.

Used as permanent pneumatic resistances are the devices receiving pressures $P_1$ and $P_2$ at their input, air weight rate G—proportional to the difference of input pressures $P_1-P_2$—being established at the output.

FIGURE 30 shows the device used as a nonadjustable permanent pneumatic resistance. It consists of body 52, calibrated capillary tube 53, filter 54 and leads 55 and 56. Calibrated capillary tubes of various diameters and lengths are inserted inside the body by means of a screw 57.

The air entering the body through lead 55 at a pressure of $P_1$ leaves it through lead 56 at a pressure of $P_2$. For the nonadjustable permanent pneumatic resistance with a definite capillary tube there exists only one consumption characteristic having quite definite incidence and degree of linearity.

FIGURE 31 shows the device used as an adjustable permanent pneumatic resistance which consists of body 58 with shaped seat, movable shaped plug 59 and leads 60 and 61. Position of movable plug 59 relative to the seat edges corresponds to a definite consumption characteristic taken out of the whole characteristic range.

FIGURE 32 presents a graph of the loci of such characteristics. Resistance (conductivity) of the device may vary from 0 (when the movable plug is driven out of the seat) to infinity (when the seat is overlapped by the plug).

Used as a pneumatic operational link is two devices cut in the circuit as is shown in FIGURE 33. This circuit is provided with pneumatic capacity 62 which is designed similar to the other elements of the system and equipped with two leads 63 and 64 found at one side of the element and an adjustable permanent pneumatic resistance with its own leads 60 and 61. Independent input $P_1$ enters the pneumatic inertia component through lead 61, output P being obtained through lead 63. Leads 60 and 64 are interconnected. The pneumatic inertia component carries out timing operation which consists in that an uneven increase (decrease) of input quantity $P_1$ (as is shown in FIGURE 34) causes an exponential increase (decrease) of output quantity P.

A set of the above considered seven types of elements constitutes a multipurpose system of elements of industrial pneumatic automation which makes it possible to design a broad variety of automatically controlled devices by purely pneumatic means. The four elements—comparison element, pneumatic relay, discrete and continuous memory elements—are the principal components of the system, the rest of the components of the system, having minor importance. Thus, the pneumatic comparison element used in circuits in various combinations with pneumatic resistances and pneumatic inertia elements make it possible to carry out any linear computing operations, such as summation, differentiation, integration, etc.

When accomplishing linear computing operations the pneumatic comparison element carries out the same function as a computing (operational) amplifier does in electronic circuits and, therefore, pneumatic computing circuits within the limits of this system may be designed in accordance with the same regular methods which are applied in designing similar circuits by electrical means. Accuracy of carrying out operations by pneumatic means, as usual, is limited by linearity degree of throttles. Besides, the pneumatic comparison element enables the circuits to be designed for converting continuous quantities into discrete quantities which is frequently required to be realized in modern control systems.

Elementary logical operations (not, and, or, etc.) are realized on the basis of the pneumatic relay. Hence, utilizing various combinations of cutting in the pneumatic relay, it is possible to design pneumatic discrete (relay) circuits which carry out any algebraic logical operation in a manner analogous to the case when one-pulse discrete (relay) circuits are designed by electrical means (for instance, one-pulse relay contact circuits). Connection circuits showing how the pneumatic relay is cut in for carrying out certain algebraic logical operations will be illustrated hereafter.

The presence of the discrete memory cell in the system enables the former to be converted into a one-pulse delay element, and, hence, makes it possible to accomplish any time logical functions, i.e. to design any multipurpose discrete (relay) circuits or, in other words, to design any terminal automatic and consequence machines.

The presence of a continuous storage cell in the system broadens still wider its abilities comprising the group of intermittent systems of automatic control.

The most typical example of designing circuits by means of the elements comprised in the patented universal system of linear computing operations is a controller ensuring the proportional law of control with integral action (controller). Such a controller is very common with the above mentioned controlling unit of aggregate systems. Its circuit, presented in FIGURE 35 is made up of comparison elements 65, 66, 67 used here as operational (computing) amplifiers, permanent pneumatic resistances 68 to 77, inertia cell 78 and continuous pneumatic repeater 79. Permanent pneumatic resistances 76 and 77 and the throttle of inertia cell 78 are of the adjustable type and are meant for adjusting the controller.

If conductivity of pneumatic resistance 76 is denoted $\alpha_1$, conductivity of pneumatic resistance 77 is denoted $\alpha_2$, and conductivity of inertia cell 78 is denoted $\alpha_3$, then the operations required for the controller are realised by the circuit under consideration as follows:

$$P = K(P_1 - P_2)P_3$$
$$T \cdot dP_3/dt = P_1 - P_2$$

where $$K = \alpha_1/\alpha_2$$
$$T = (V/R\theta) \cdot (1/\alpha_3)$$

The single and double pulse logical functions given in FIGURE 36 may serve as an example of realising algebraic logical functions. All presented logical functions are obtained by various cutting in of one or two pneumatic relays. FIGURES 37 to 43 show connection diagrams for the pneumatic relay and the table of FIGURE 36 shows corresponding conventional mathematic representations of corresponding logical functions as well as values of independent inputs $P_1$, $P_2$, and output P in the areas designated $a$ through $g$ respectively.

In FIG. 36 the logical expressions identified by the letters $a$ through $g$ are the following functions:

$a$—"Negation"
$b$—"And"
$c$—"Or"
$d$—"No go" or "forbiddence"
$e$—"If then" or "implication"
$f$—"Logical sum" or "exclusive or"
$g$—"Tantamount to" or "equivalence"

The connections for the basic pneumatic relays pictured in FIGS. 37 through 43 are made to carry out the functions of $a$ through $g$ expressed in FIG. 36, with the circuits being depicted opposite their intended functions, utilizing, of course, the definitions heretofore presented for the inputs and outputs to the circuitry. Thus, FIG. 37 shows a pneumatic relay connected to carry out the logical operation negation or not. FIG. 38 depicts the connections for the logical operation and. FIG. 39 shows the relay connected to perform the operation or. FIG. 40 shows a different type connection to perform the function no go. FIG. 41 illustrates the manner of carrying out the function if then or implication. The relays of FIG. 42 are arranged to perform logical sum or exclusive or and the relays of FIG. 43 enable the function tantamount to or equivalence.

These logical expressions are mathematically described in a book by S. Caldwell entitled "Logical Synthesis of Relay Arrangements," available from Foreign Literature Publishing House, Moscow, published in 1959.

An example of realising time logical operation and which may serve the one-pulse delay operation is (as is shown in FIGURE 44) carried out by means of two discrete memory elements, one of which memorises at $P_t = 1$, the other at $P_t = 0$. FIGURE 45 illustrates the time characteristics of such an element. Independent input P received by the first memory element is memorised at $P_t = 1$ and, after discrete repeater $A_1$ an output signal P* is fed to the input of the second memory element where it is memorized at $P_t = 0$ and, after discrete repeater $A_2$, is fed away from the circuit as output signal P.

The pneumatic flip-flop circuit is another example of time operation. As is seen from the circuit diagram presented in FIGURE 46, the pneumatic flip-flop is equipped with two discrete storage cells and a negation element.

The pneumatic flip-flop circuit is provided with a single independent input command input $P_t$ and output P of the second discrete storage cell is inversed in the negation element to $\bar{P}$ which serves as an input to the first discrete storage cell. FIGURE 47 presents the time characteristics of operation of the pneumatic flip-flop showing conditions of separate sections of the signal chain in time.

Finally, the circuit of a pneumatic automatic optimiser (extreme controller), e.g. with memorising of maximum, may serve as an example of a developed circuit designed on the pneumatic elements of the universal system. Operations of algebraic and time logic operations of accurate comparison, integration and memorising of continuous quantity are carried out in this circuit. More detailed description of the pneumatic optimiser is the object of another patent.

The principles of the invention explained in connection with the specific exemplifications thereon will suggest many other applications and modifications of the same. It is accordingly desired that, in construing the breadth of the appended claims they shall not be limited to the specific details shown and described in connection with the exemplifications thereof.

What is claimed is:

1. A pneumatic apparatus for performing memory functions comprising in combination, a body member comprised of a plurality of discs and rings assembled together to include chambers within the body member; a plurality of membranes respectively fixed between certain of said discs and rings to subdivide each of said chambers; movable valve members disposed within said chambers and adapted to move said membranes; conduit means in communication with said subdivided chambers for pressure ingress and egress to operate said movable valve members; at least one of said subdivided chambers being blind whereby the application of a command input pressure having two discrete pressure levels to at least one of said conduits and application of a second independent input pressure signal to at least another of said conduits produces an output pressure which is a memorization of the second input pressure signal at the moment of change of the command pressure from one level to the other until said command pressure changes from the other level to said one level by locking into the blind chamber the magnitude of said second input pressure signal.

2. The apparatus of claim 1 wherein said body member, movable members, membranes, subchambers and conduits comprise two pneumatic relays with one relay serving as a discrete repeater and the other relay disconnecting said repeater from the second input pressure signal and locking the pressure level thereof at the time of memorization in the blind chamber.

3. The apparatus of claim 1 wherein said body member, movable members, membranes, subchambers and conduits comprise a continuous repeater and a pneumatic relay wherein the blind chamber is disposed in the continuous repeater and the relay locks the level of said second signal input pressure at the time of memorization therein.

References Cited
UNITED STATES PATENTS

| | | | |
|---|---|---|---|
| 2,638,922 | 5/1953 | Caldwell | 137—86 |
| 2,774,367 | 12/1956 | Grogan | 137—86 |

OTHER REFERENCES

Berends et al., "Pneumatic Switching Circuits," Automatic and Remote Control, vol. 20, No. 11, pp. 1446–1456, September 1958.

Berends et al., International Federation of Automatic Control, Trudy Mezhdunarodnogo Kongressa, 1st, Moscow 1959, pp. 431–48.

RICHARD B. WILKINSON, *Primary Examiner.*

LEO SMILOW, LOUIS J. CAPOZI, *Examiners.*

W. F. BAUER, L. R. FRANKLIN, *Assistant Examiners.*